UNITED STATES PATENT OFFICE.

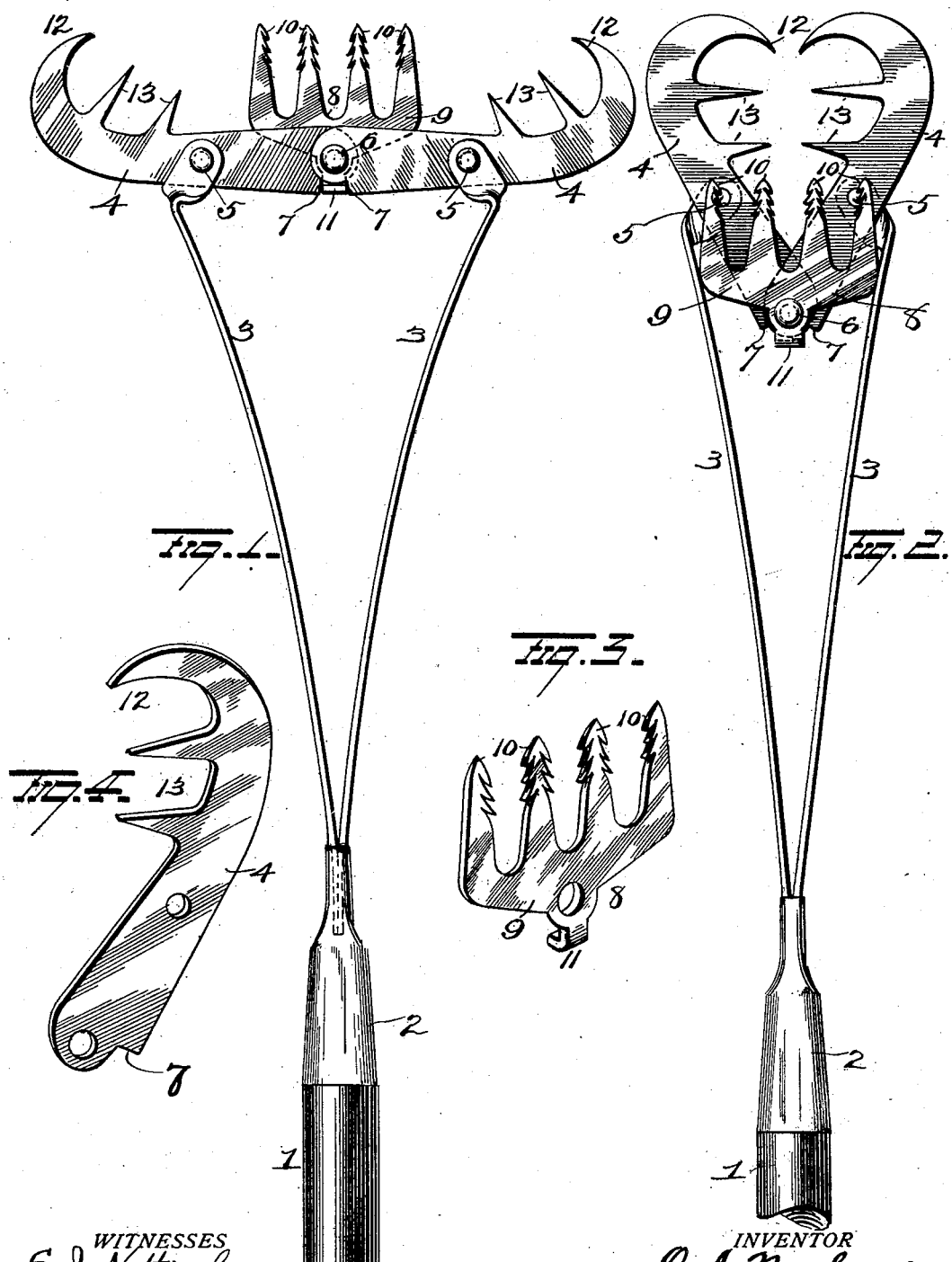

OLOF A. NORLUND, OF WILLIAMSPORT, PENNSYLVANIA.

SPEAR OR GIG.

SPECIFICATION forming part of Letters Patent No. 689,743, dated December 24, 1901.

Application filed April 13, 1901. Serial No. 55,722. (No model.)

*To all whom it may concern:*

Be it known that I, OLOF A. NORLUND, a resident of Williamsport, in the county of Lycoming and State of Pennsylvania, have invented certain new and useful Improvements in Spears or Gigs; and I do hereby declare the following to be a full, clear, and exact description of the invention, such as will enable others skilled in the art to which it appertains to make and use the same.

My invention relates to an improvement in spears and gigs, the object of the invention being to provide an improved device of this character which will automatically and firmly grasp an object upon being brought into contact therewith.

With this object in view the invention consists in certain novel features of construction and combinations and arrangements of parts, as will be more fully hereinafter described, and pointed out in the claims.

In the accompanying drawings, Figure 1 is a perspective view illustrating my improvements in the position to grasp an object. Fig. 2 is a similar view showing the jaws sprung, and Figs. 3 and 4 are detail views.

1 represents a handle or rod to one end of which a thimble 2 is secured. In the contracted outer end of the thimble 2 flat spring-arms 3 are secured and are bent or twisted at right angles at their outer ends and pivotally connected between the ends of clamping-jaws 4 by rivets 5, said jaws being pivotally connected together at their inner ends by a pin or rivet 6, and the meeting ends of the jaws are notched, as shown at 7, for a purpose which will be hereinafter explained. A trigger 8 is also secured on the pin or rivet 6 and comprises a plate 9, having a series of notched teeth or prongs 10 thereon, and a bent lug 11 on its rear end projecting around to the opposite side of the jaws and adapted to be disposed in the notched portions 7 thereof to limit their opening movement. The jaws 4 curve inward at their free ends and are sharpened to form teeth 12, and are provided between their ends with teeth 13, as shown.

In operation the free ends of the jaws are drawn apart until the main portions thereof are practically in alinement, the teeth or prongs 10 on trigger 8 projecting out beyond those on the jaws 4 and the bent lug 11 on the trigger disposed in the notched inner ends of the jaws. When the jaws are in this set position, the spring-arms 3 are forced apart and the rivet or pin 6, pivotally connecting the jaws, is projected out slightly beyond the plane of the rivets 5, so that the tension of the spring-arms 3 will hold the jaws in their open or set position. The operator grasps the handle or rod 1 firmly, and when near enough to the prey thrusts the trigger 8 against it, and this blow against the trigger forces the rivet or pin 6, or, in other words, the pivotal connection of the jaws 4, inward, when the spring-arms 3 will complete the movement of the jaws and force them sharply together, thereby driving the teeth 12 and 13 into the flesh of the prey and securely grasp the same, and owing to the inwardly-projecting teeth prevent any possibility of escape. The trigger 8 also serves as a stop against which the spring-arms 3 strike, as shown in Fig. 2, to limit the inward movement of the jaws, preventing them from coming together and breaking or bending the teeth or prongs. The teeth or prongs 10 on the trigger 8 are notched or roughened to hold in the prey and assist in securing the same.

It will be seen that with my improved device the slightest blow on the trigger 8 will release the jaws 4 and permit them to be forced into the prey by the spring-arms 3, thus enabling the hunter to use this spear for birds, fish, or animals, as but slight force is needed to operate the trigger and the resistance of a body against which it is driven is sufficient to release the same.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. A spear or gig comprising spring-arms, jaws pivotally connected together and between their ends to the spring-arms, a trigger connected to the jaws at their juncture between the spring-arms, and teeth or prongs on the trigger projecting beyond the jaws when set.

2. A spear or gig comprising spring-arms, jaws pivotally connected together and between their ends to the spring-arms, a trigger connected to the jaws at their pivotal connection with each other and so shaped as to be struck by the spring-arms when sprung together, and limit the movement of the jaws.

3. A spear or gig comprising spring-arms, jaws pivotally connected together at one end and between their ends to the spring-arms, teeth on the jaws, a trigger connected to the jaws at their pivotal connection with each other, and a bent lug on the trigger disposed in notched portions of the jaws and limit their opening movement.

4. A spear or gig comprising a thimble to be secured on a handle or rod, spring-arms secured at one end in said thimble, toothed jaws pivotally connected between their ends to the outer ends of the arms, a rivet or pin pivotally connecting the jaws together, a trigger secured on said rivet or pin and serving as a stop to limit the inward movement of the spring-arms and jaws, teeth or prongs on the trigger projecting outward beyond the teeth on the jaws to first engage the prey and release the jaws, and a bent lug on the trigger disposed in notched portions of the jaws to limit the opening movement thereof.

In testimony whereof I have signed this specification in the presence of two subscribing witnesses.

OLOF A. NORLUND.

Witnesses:
GEO. W. PEPPERMAN,
J. F. STRIEBY.